June 12, 1956  D. P. RITCHIE  2,750,071
PORTABLE TIRE INFLATING APPARATUS
Filed Dec. 8, 1953  2 Sheets-Sheet 1
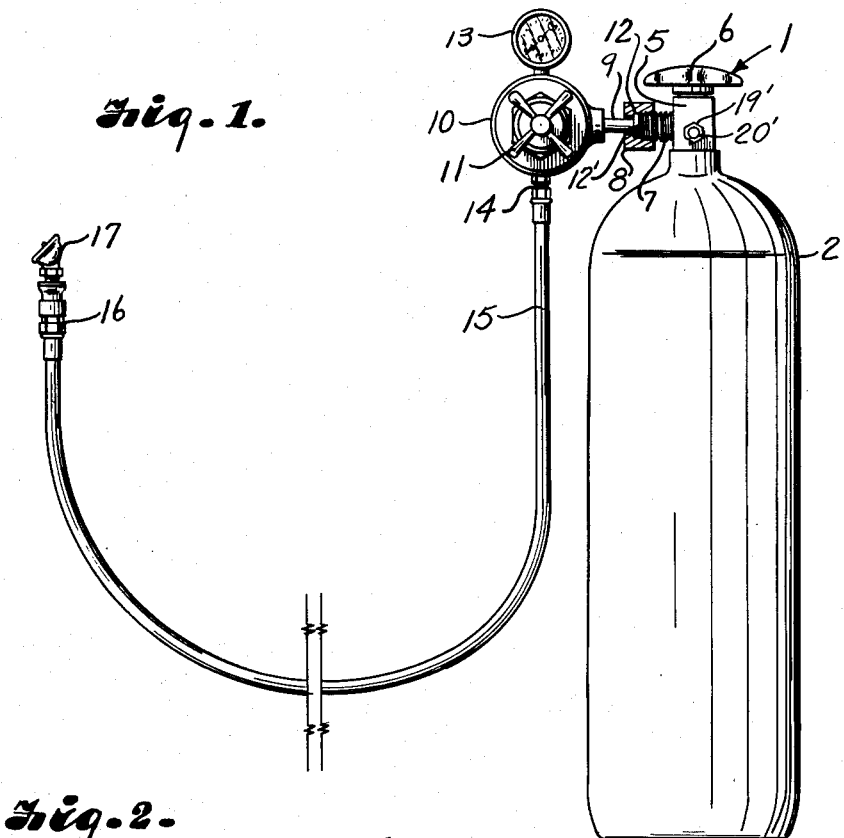
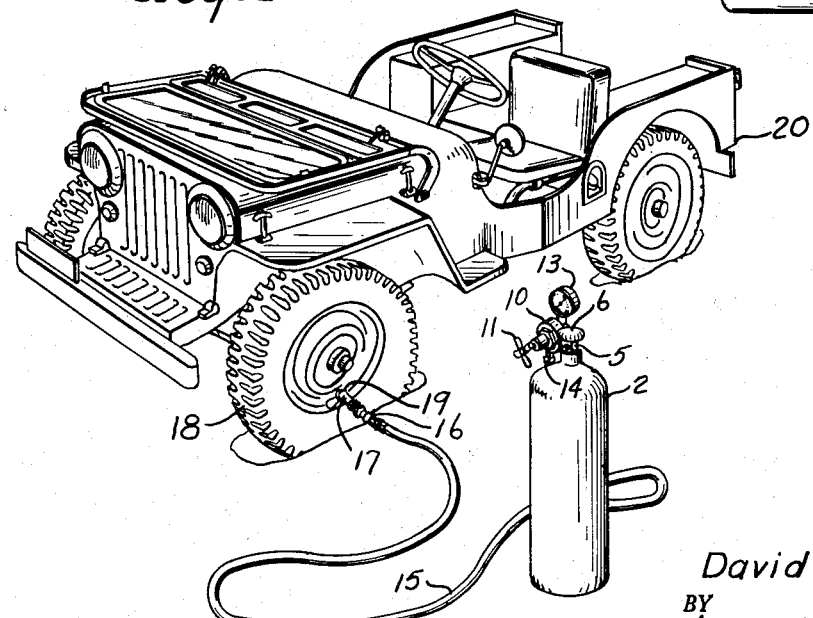
INVENTOR.
David P. Ritchie.
BY
Fishburn Mullendore
ATTORNEYS.

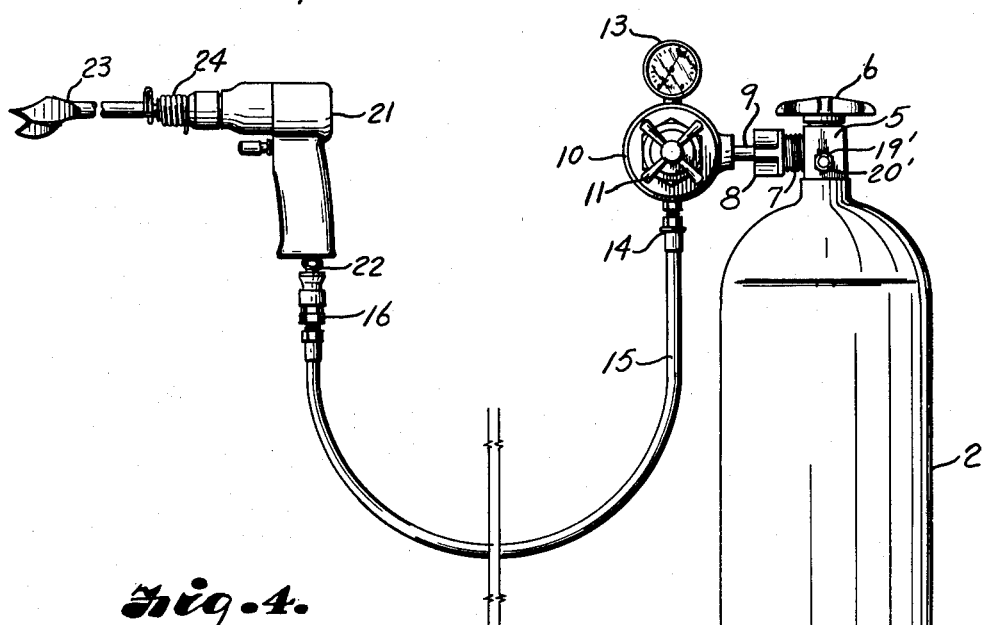
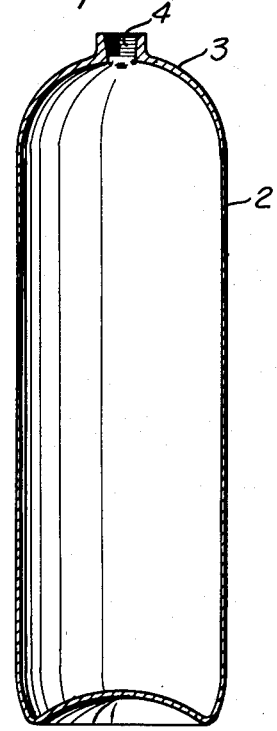
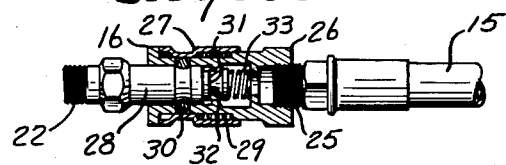

United States Patent Office 2,750,071
Patented June 12, 1956

2,750,071
PORTABLE TIRE INFLATING APPARATUS

David P. Ritchie, Prairie Village, Kans.

Application December 8, 1953, Serial No. 396,950

2 Claims. (Cl. 222—3)

This invention relates to a portable gas container and equipment for handling gases, such as nitrogen and/or carbon dioxide at high pressures and which is particularly adapted for use of such equipment in safely inflating tires, operating lubrication equipment, or other equipment requiring a gas supply under pressure for such operation.

Heretofore, in tanks of this character, the amount of volume capable of being carried therein was insufficient to last the required amount of time to accommodate the use thereof without frequent refilling. Also with such other equipment there was no way to limit the amount of gas to be dispensed from the container which often resulted in danger to the workmen.

It is the principal objects of the present invention to provide a pressure tank, for example, a twenty pound cylinder which is filled with approximately twenty pounds of liquid carbon dioxide after the cylinder has been supercharged with nitrogen at approximately two hundred pounds gauge pressure from a higher pressure nitrogen supply tank; to provide apparatus of this character which may be regulated to limit the pressure in number of pounds dispensed from the nozzle of the equipment, thus eliminating to a great extent the likelihood of danger to workmen; to provide a tank having valves for regulating the amount of pressure metered from the tank with a pressure gauge to indicate such amount; to provide a hose connected to said valve adapted to be connected to the tire to be inflated or to a tool to be operated; to provide such apparatus adaptable for operating grease lubrication equipment, air lift jacks, air powered cutting tools, impact wrenches, air drills, tanks containing insecticide sprays, air hammers, rivet guns, and other apparatus.

The pressure tank constituting my invention is light in weight and easily portable to various places of use and is particularly adapted for farm use where the farmer may have use of equipment of this character at points remote from the usual permanent installation. For instance, if a tractor tire is deflated at some distance from his garage or air inflating equipment, generally around a filling station, the present invention may be transported in a vehicle or the like to the tractor and the tire inflated at its place of use.

In accomplishing these and other objects of the present invention, I have provided improved details of structure the preferred forms of which are illustrated in the accompanying drawings wherein:

Fig. 1 is a side elevational view of the invention with a dispensing valve being attached to the hose for use in inflating equipment such as tires.

Fig. 2 is a perspective view of the invention showing the hose attached to a tire of a vehicle or the like.

Fig. 3 is a side elevational view of my invention shown with an air operated hammer for operating a cutting tool.

Fig. 4 is a cross-sectional view through the tank.

Fig. 5 is a fragmentary cross-sectional view of the air hose illustrating the quick connection for the tool to be operated.

Referring more in detail to the drawings:

1 designates a pressure apparatus embodying the features of my invention comprising a tank 2 for containing nitrogen or carbon dioxide. The tank 2 is made of metal or other suitable material sufficient to stand comparatively high pressures and is rounded at the top as indicated at 3 and has a threaded opening 4 adapted to receive a slow opening valve 5 adapted to be opened and closed by the hand member 6.

An externally threaded outlet 7 is integrally formed as a part of the valve 5 and engaging the free end thereof is an internally threaded connection 8 which is slidably mounted on a tube 9 which is integrally formed with a valve 10 for regulating pressure from the tank by manipulation of the handle 11. The tube 9 has a shoulder 12 which engages the shoulder 12' of the connection 8 to hold the connection on the tube and effecting a seal when fastened to the threaded connection 7. A pressure gauge 13 is connected with the valve 10 so as to determine the desired pressure leaving the tank to the place of use.

A connection 14 is also connected to the valve 10 and is adapted to receive a hose 15 having a quick connector 16 on the free end thereof and having a dispensing valve 17 attached thereto for use in connection with a valve of a tire 18 for inflation thereof as indicated at 19 (Fig. 2) of a vehicle as indicated at 20. The valve 5 is provided with a safety pop-off valve 19' provided with the usual frangible disk (not shown) and having a pressure release cap 20'.

In Fig. 3 there is shown a hammer or air powered tool 21 connected to the hose 15 through the quick connector 16 for operation and connection 22 for operating a cutter 23 or other implement which may be operated from the air powered tool 21, the cutter 23 being readily attached and detached from the hammer 21 by a connector 24. The quick connector 16 comprises the usual threaded member 25 on the end of the hose 15, to which is attached a sleeve 26 adapted to be engaged by a sleeve 27 engaging the end 28 of the connector 22 with the usual spring 29 and ring washer 30. An automatic check valve 31 closes when there are no tools on the connector 16. The end 32 of the stem 28 opens and holds the valve open when tools are connected, pressure aided by a spring 33 closes the valve when connection is broken.

It will also be obvious that any equipment such as lubrication or the like may be connected to the hose by suitable connection and operated by the pressure from the tank 2.

In order to fill the tank 2 with nitrogen or carbon dioxide the connection 8 is removed and the nitrogen and carbon dioxide may be inserted through the threaded outlet 7 from a source (not shown) when the valve 5 is opened and when the desired amount of pressure is contained in the tank the valve 5 may be closed and the source of supply disconnected from the threaded outlet 7 and the connection 8 reconnected thereto for connecting the valve and hose thereto so that the equipment is ready for use.

When the device is ready for use the slow opening valve 5 is opened and the regulator 10 opened by manipulation of the handle 11 until the pressure gauge indicates the desired pressure needed for use in inflating tires, operating the cutting tools, lubricating equipment, air drills, air hammers or any other equipment as herein specified. The air hammer 21 may be quickly and easily connected to the hose 15 through the quick connector 16. This connection may also be utilized for connecting whatever material is desired to be used with the equipment.

I have found that the approximate weight of liquids given above are particularly adapted for use of the apparatus in cold climates, but for warmer climates the tank may be filled with approximately twenty pounds of liquid carbon dioxide without the addition of nitrogen.

It will be obvious from the foregoing that I have provided an improved portable tank for containing nitrogen and/or carbon dioxide which may be quickly and easily transported from place to place for operating various types of equipment and inflating tires.

What I claim and desire to secure by Letters Patent is:

1. A portable pressure tank capable of containing liquid carbon dioxide of approximately 20 pounds by liquid weight, said tank having a valve attached to one end including safety pop-off means, means for operating said valve, a pressure regulating valve, means connecting the pressure regulating valve to said first named valve, said means including an internally threaded connection slidably mounted on tubular connection to said pressure regulating valve and means on said tubular connection and said threaded connection for sealing said connections together, a gauge connected to said last named valve, and a hose having one end connected to said pressure regulating valve, said hose having means at its other end for connection to an air driven tool for operating the same.

2. A portable device for inflating pneumatic tires, comprising a cylindrical tank capable of containing liquid carbon dioxide up to approximately 20 pounds by liquid weight, said tank having a valve attached to one end thereof including safety pop-off means, means for opening and closing said valve, an outlet in said valve, a second valve having a tubular connection for regulating pressure from said tank, means connecting the tubular connection to the outlet in the first named valve, said means including an internally threaded connection slidably mounted on said tubular connection and means on said connection for forming a seal between the two connections, a pressure gauge connected to said last named valve, and a hose having one end connected to said last named valve and having means on its other end for dispensing said carbon dioxide therefrom for use.

References Cited in the file of this patent

UNITED STATES PATENTS

| 765,022 | Lowenstein | July 12, 1904 |
| 802,905 | Bobrick | Oct. 24, 1905 |
| 867,942 | Bobrick | Oct. 15, 1907 |

FOREIGN PATENTS

| 365,037 | France | Sept. 1, 1906 |